United States Patent
Coan et al.

(10) Patent No.: US 7,120,424 B1
(45) Date of Patent: Oct. 10, 2006

(54) METHOD AND APPARATUS FOR PROVIDING ENHANCED SERVICES AT A MOBILE COMMUNICATION DEVICE

(75) Inventors: William Coan, Monroe, WA (US); Michael Luna, Dublin, CA (US)

(73) Assignee: Cingular Wireless II, LLC, Atlanta, GA (US)

( * ) Notice: Subject to any disclaimer, the term of this patent is extended or adjusted under 35 U.S.C. 154(b) by 883 days.

(21) Appl. No.: 09/802,872

(22) Filed: Mar. 12, 2001

(51) Int. Cl.
*H04L 29/06* (2006.01)

(52) U.S. Cl. ............................. 455/414.1; 455/414.3; 379/201.12

(58) Field of Classification Search ............. 455/414.1, 455/418, 419, 420, 414.3, 466; 379/15.03, 379/201.01, 201.12
See application file for complete search history.

(56) References Cited

U.S. PATENT DOCUMENTS

| | | | |
|---|---|---|---|
| 5,943,611 A * | 8/1999 | Molne ........................ 455/564 |
| 6,539,238 B1 * | 3/2003 | Brouns et al. ............... 455/558 |
| 6,668,055 B1 * | 12/2003 | Marwell et al. .......... 455/414.3 |
| 6,697,484 B1 * | 2/2004 | Fleming, III ................ 379/354 |
| 2001/0034244 A1 * | 10/2001 | Calder et al. ............... 455/556 |
| 2002/0024536 A1 * | 2/2002 | Kahan et al. ................ 345/745 |
| 2002/0068554 A1 * | 6/2002 | Dusse ........................ 455/414 |

\* cited by examiner

*Primary Examiner*—Ovidio Escalante
(74) *Attorney, Agent, or Firm*—Kenyon & Kenyon LLP

(57) ABSTRACT

A method and apparatus provide for enhancing personal information management (PIM) services available through a mobile communication device. A PIM service is designed with a full set of features. The mobile communication device is programmed to be able to execute a subset of said full set of features on a stand-alone basis. The device is further programmed to access network resident features when a user initiated command requests a feature not available to the mobile communication device in its stand alone state.

21 Claims, 4 Drawing Sheets

METHOD AND APPARATUS FOR PROVIDING ENHANCED SERVICES AT A MOBILE COMMUNICATION DEVICE

BACKGROUND OF THE INVENTION

The present invention relates to services provided on mobile communication devices. More specifically, the present invention is directed to a method and apparatus for providing enhanced services at such devices.

Since its introduction, wireless communication service has grown dramatically as individuals have seen the value of being able to conduct business and take care of personal issues while being mobile. An example of a known configuration for providing mobile communication service is illustrated in FIG. 1. Mobile stations, also referred to as mobile communication devices, 100 and 101 can be in wireless communication with antenna/transceiver structures such as those represented by towers 102 and 103. Towers 102 and 103 are associated with respective base stations 104 and 105. The towers and base stations make up the wireless transmission and receiving points throughout an area covered by a wireless communications network. These areas are typically referred to as cells, giving rise to the common terminology "cellular" network. The base stations 104, 105 provide the electronic capabilities for allocating wireless spectrum to mobile communication devices 100, 101 in the cell or cells serviced by the towers and base stations associated therewith. The base stations 104, 105 are connected to a mobile switching center (MSC) 106. A given service provider area can include multiple MSCs. For simplicity of illustration, only one MSC is shown in FIG. 1. Each MSC has associated therewith a home location register (HLR) 108, which identifies subscribers, also referred to as users, associated with a given service provider as well as service features available to those subscribers. Multiple MSCs could share an HLR. A visitor's location register (VLR) 110, which identifies those mobile stations not listed in the MSC's HLR, but registered in a region serviced by a base station associated with the MSC, is also associated with the MSC.

One of the services available in a wireless communication network is messaging. This service enables a mobile communication device subscriber to receive messages from a message center (MC) 112. Messages can take the form of audio messages or text messages. Other services may also be available in a wireless communication network. The MSC 106 can be coupled to a public switched telephone network (PSTN) 114 thereby providing a gateway from the wireless communication network to a land line network. This may enable connections to either other communication networks (not shown) or to land line equipment such as telephone 1116. Additionally, the MSC 106 may be coupled to other communications networks, such as for example the Internet 118, as shown in FIG. 1.

Today's mobile communication devices 100, 101 have processor and memory devices disposed therein so as to enable certain functional capabilities. Among those capabilities are such things as sending and receiving short messages (known as the short messaging service SMS) and having browser capabilities which allow over-the-air access to data networks. Furthermore, the mobile communication devices 100, 101 may include sufficient processing and programming capabilities to enable features such as caller-identification, speed-dialing, etc., which all enhance the communication capabilities of the subscriber who uses the mobile communication device. However, to maintain the mobile nature of a mobile communication device 100, 101 limitations may be imposed on its processor and programming capabilities. Thus, the extent of services operating locally within a mobile communication device has been somewhat limited. It would be advantageous if a way was found to enhance the local services available on a mobile communication device 100, 101 without dramatically affecting the hardware and software requirements for the mobile communication device.

SUMMARY OF THE INVENTION

The present invention provides a method and an apparatus for enhancing the local services available at a mobile communications device. In accordance with an embodiment of the present invention, a wireless communication system includes an enhanced local services server. In this circumstance, the mobile communication device may include processing and programming capabilities which create local services such as a personal telephone or address book or a personalized calendar service. A user interacts with the local service on the mobile communication device and the limitations of the device itself with regard to the service are to a large part hidden from the user by providing supplementing services with the enhanced local services server within the network. Thus, when the user requests information which is not available locally on the mobile communication device, a query is automatically generated by the mobile communication device and communicated via a wireless channel, such as a digital control channel, to the enhanced local services server which provides the supplemental information in response to the query. This query in response to the event can largely be invisible to the user of the mobile communication device. As a consequence of this arrangement, the services available at the mobile communication device can be enhanced by relying on global processing and programming capabilities established within the network and which can be shared by multiple parties thereby justifying their cost.

DETAILED DESCRIPTION

The present invention provides a method and apparatus by which a mobile communication device may have a local service capability associated therewith and have that local service capability enhanced by resources allocated within, or coupled to the wireless communications network.

Figure 2:
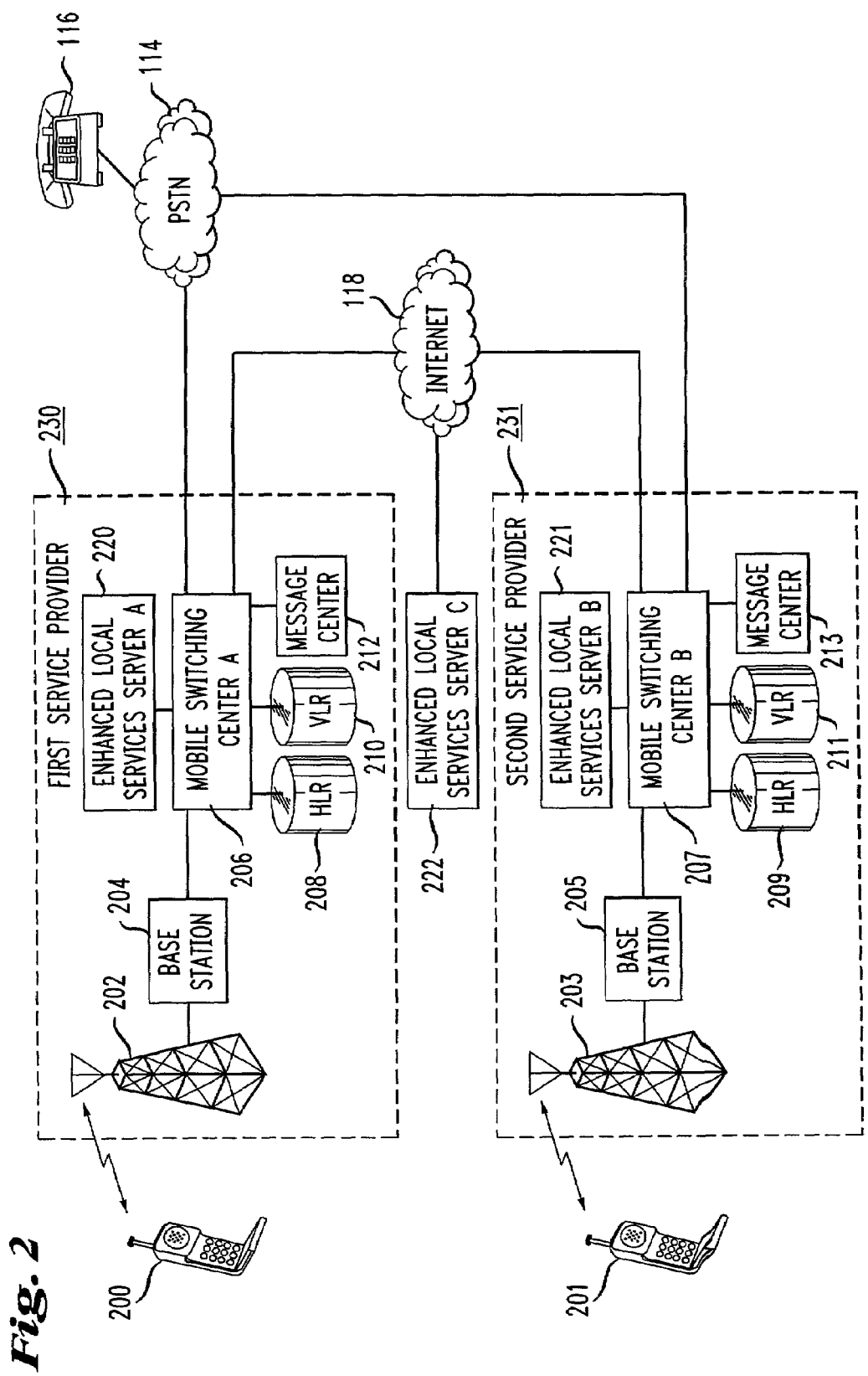
FIG. 2 is a block diagram illustrating a communication system in accordance with an embodiment of the present invention.

FIG. 2 is a block diagram of a wireless communication system arrangement which can implement an embodiment of the present invention. The block diagram of FIG. 2 depicts the wireless communications networks of two independent service providers. A first service provider 230 may be associated with mobile switching center A 206 and its related equipment, while a second service provider 231 may be associated with mobile switching center B 207, and its related equipment. Of course, a service provider 230, 231 may have more than one MSC and multiple cellular towers and base stations may be coupled to a single MSC. However, for simplicity of illustration, FIG. 2 depicts two MSCs 206, 207 operated by two distinct service providers 230, 231 each MSC 206, 207 having a single base station 204, 205 and a single tower 202, 203, respectively.

Figure 1:
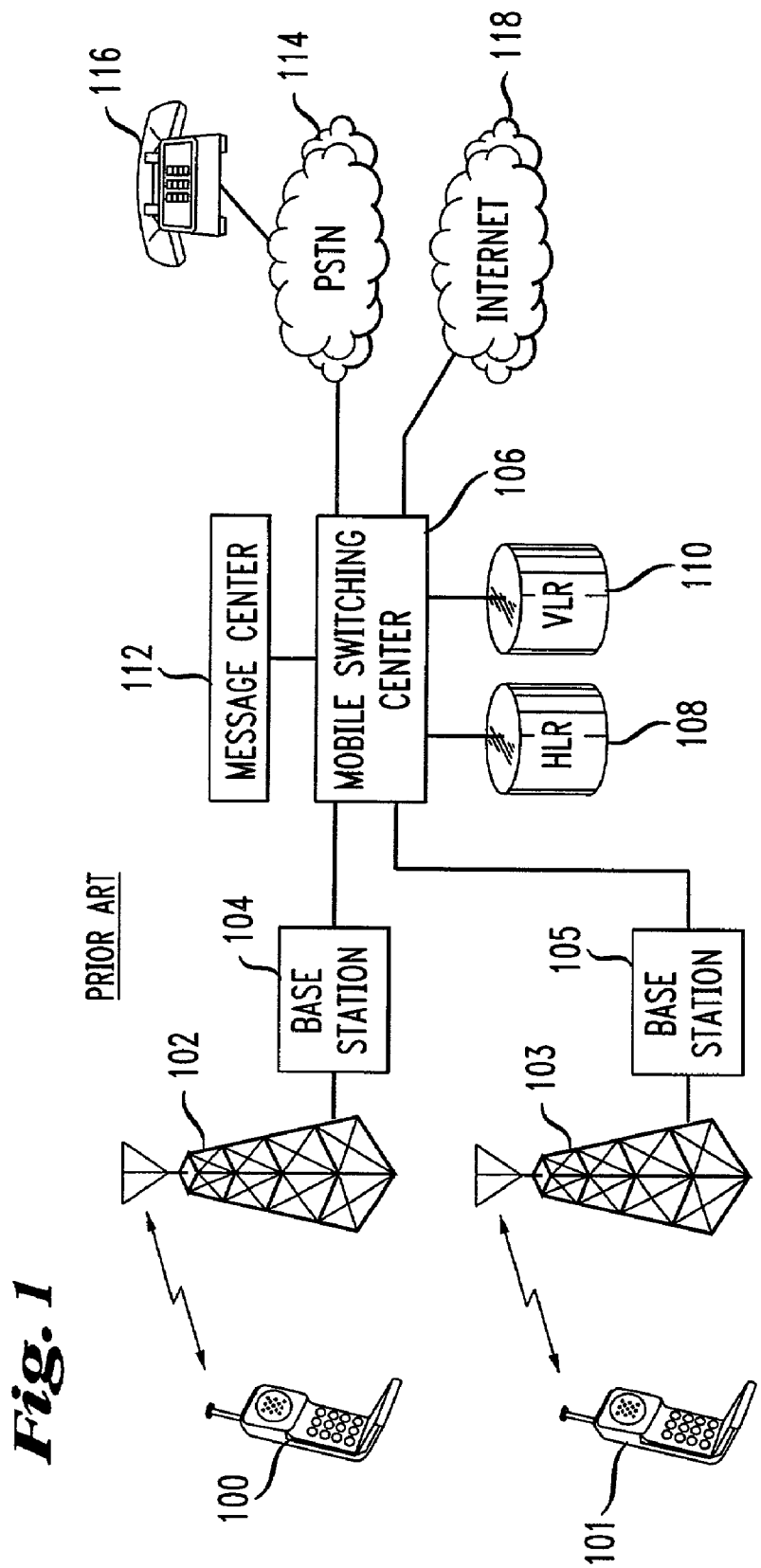
FIG. 1 illustrates an example of a known wireless communication system configuration.

The wireless communications networks illustrated in FIG. 2 are similar to that illustrated in FIG. 1 with an important exception, namely the inclusion of elements identified as enhanced local services server A 220, enhanced local services server B 221, and enhanced local services server C 222. In the system arrangement of FIG. 2, mobile station 200 and mobile station 201 can conduct wireless communications with transceivers associated with the cell cites of towers 202 and 203, respectively. Each of these cell sites has associated therewith a base station 204, 205, respectively. The base stations 204, 205 are coupled to mobile switching center A 206 and mobile switching center B 207, respectively. The mobile switching centers 206, 207 have associated therewith HLRs 208, 209 and VLRs 210, 211, which may be similar to the HLR 108 and VLR 110 of FIG. 1. Furthermore, the MSCs 206, 207 can be coupled to a public switched telephone network (PSTN) 114 so as to provide connectivity to wire line communication devices such as telephone 116 or to other communication networks, such as, for example, the Internet 118. The enhanced local services servers 220, 221, 222 include processors and memories (not shown) to store programs and data that supplement local services available on the mobile communication devices 200, 201 themselves. In addition the enhanced local services servers 220, 221, 222 can control other personal information services available from wireless service providers 230, 231 via the wireless network. Such as, for example, instant messaging or an indication of availability for online communication.

Figure 3:
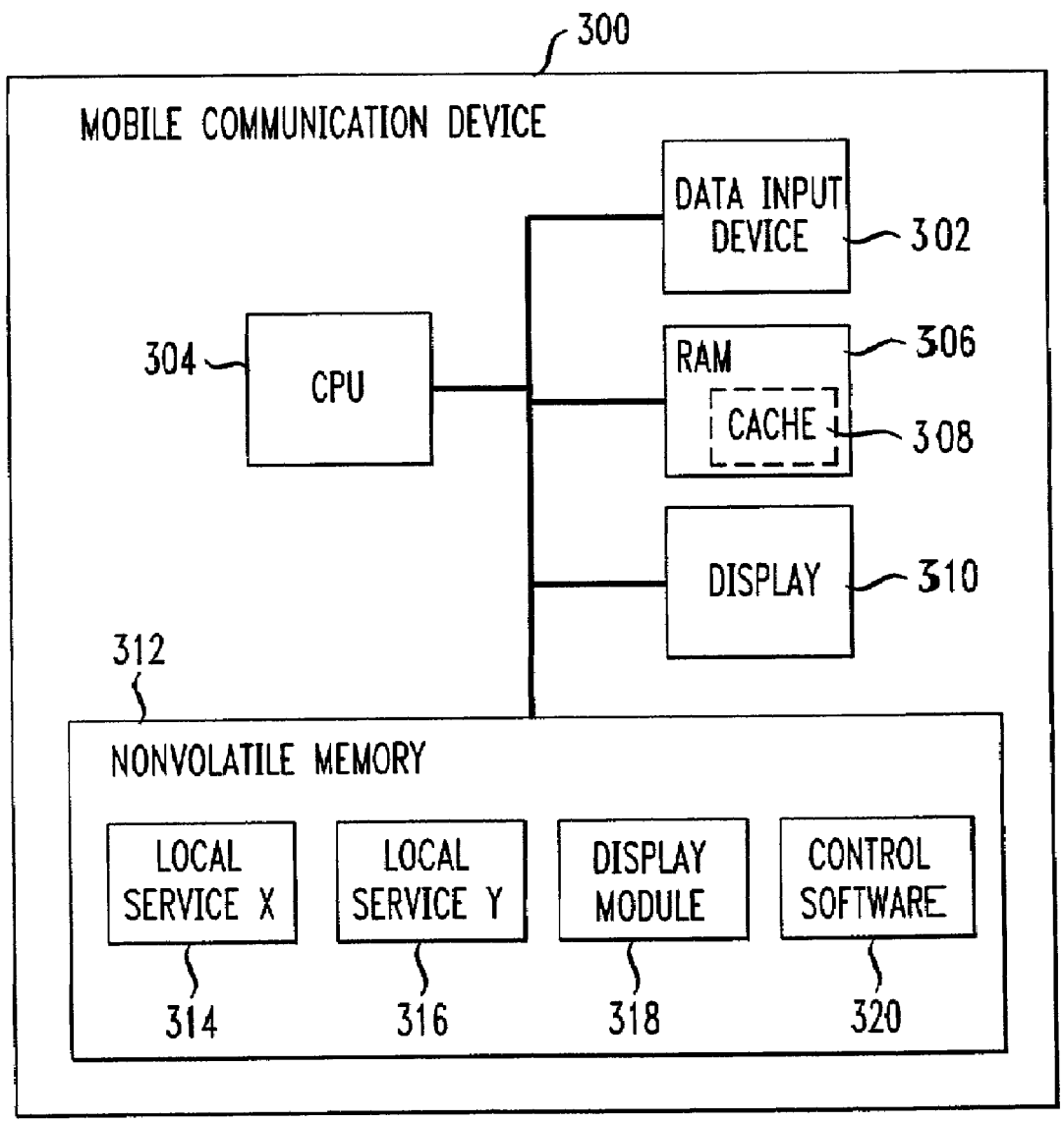
FIG. 3 is a flow diagram of a process flow in accordance with an embodiment of the present invention.

FIG. 3 illustrates a block diagram of components of a mobile communication device 300 that has the capability of providing local services features. In this arrangement, the mobile communication device 300 includes a data input device 302, a central processing unit (CPU) 304, a random access memory (RAM) 306 incorporating a cache 308, a display 310, and a read-only memory (ROM) or nonvolatile memory 312. As illustrated in FIG. 3, the nonvolatile memory 312, can include software modules or applications such as those generically referred to as local services, such as "Local Service X" 314 and "Local Service Y" 316. These local services 314, 316 may contain the software code to be executed by the CPU 304 so as to provide certain local functions such as represented by, for example, a calendar function or a telephone or address book function.

For example, a mobile communication device 300 might offer its user a local address book consisting of 200 entries. Each entry may contain fields for a name, a business phone number, a home phone number, a fax number and an e-mail address. A user could populate these fields, usually through a key pad or other data input device 302 or alternatively, via an attachment to a mobile communication device 300 such as a personal computer (not shown). In a calendar configuration, the mobile communication device 300 may have the ability to maintain calendar entries such as appointments, and provide the capability for reminders and data entry fields within calendar dates to maintain records of events. As in the situation of the address book described above, the calendar entry capabilities with regard to a mobile communication device 300 may be somewhat limited to a given number of months or days and different types of fields that may be maintained within a given calendar. This limitation may be due to, for example, limited memory capability of the mobile communication device 300.

It will be understood that nonvolatile memory 312 is not limited to storage of local services 314, 316 such as those listed above. For example, nonvolatile memory 312 may include a display module 318, which may be a software module that relates to the control or display of the mobile communications device 300. Other software modules may also be stored in the nonvolatile memory 312. Mobile communication devices, such as those represented by mobile communication device 300 also incorporate the electronics necessary for conducting wireless communications via the wireless channels available to the device when it resides within a given cell. For simplicity of illustration, such electronics are not depicted in FIG. 3.

The method of the present invention augments the local services 314, 316 available at the mobile communication device 300, 200, 201 with access to enhanced local services servers coupled to a service provider's network. Examples of such enhanced local services servers may be enhanced local services servers A, B, and C 220, 221, 222 (FIG. 2). Queries can be launched from the mobile communications device 300, 200, 201, through the wireless communications network to an appropriate enhanced local services server 220, 221, 222. As illustrated in FIG. 2, a mobile communications device 200 on the wireless network of a first service provider 230 may be able to access an enhanced local services server operated by his own service provider 230, a second service provider 231, or an enhanced local services server 222 not affiliated with any wireless service provider. Such an enhanced local services server 222 may reside on a communications network such as the Internet 118.

Taking an address book application (e.g., Local Service X 314 of FIG. 3) as an example, it may be desirable to provide a user with a capability of marking further address book entries stored on a private web site at the enhanced local services server, for example, enhanced local services server 222. These entries can then subsequently be downloaded into the local address book of a mobile communication device. In accordance with an embodiment of the invention, the application would be able to search the local address book (i.e., the address book stored on the user's mobile communication device), and then if the information is not found, the application itself would automatically search the enhanced local services server 222 or private web site for the requested information. Once found, the user would have the optional ability to either store the information locally on a temporary basis (for instance in volatile memory) or on a permanent basis, such as, for example, in nonvolatile memory 306. Alternatively, the mobile communication device could treat the recently obtained information as important information and automatically store the information locally, possibly replacing other data based on a replacement scheme algorithm. For instance, if an address book entry has not been used for an extended period of time the address book entry may be rewritten after the user has given notice to the effect that such an operation is about to occur so as to store the more recently accessed information. This would give the user the option of replacing the least frequently used address with one more recently requested. Of course, the user could decline such an operation depending on the significance of the address or telephone which is slated to be replaced. Furthermore, as will be understood from the description, information deleted form local storage on the mobile communication device may be available at the enhanced local services server 222 for any length of time, dependent on resource limitations peculiar to the particular enhanced local services server being relied upon.

To support the use of enhanced local services it is appropriate to program into the mobile communication device 300 a pointer, such as a unique application identifier, for each application that is to utilize an enhanced local services server. Additionally a Universal Resource Locator (URL) for the specific Application Programming Interface (API) required by the application, such as the API to provide search, store, and delete functions of an address book application. It may also be appropriate to provide a quality of service (QoS) indicator for the enhanced local service. Without a pointer to the enhanced local services, as provided by the unique application identifier or the URL, there is no capability of generating a data message which will search for the desired information.

Figure 4:
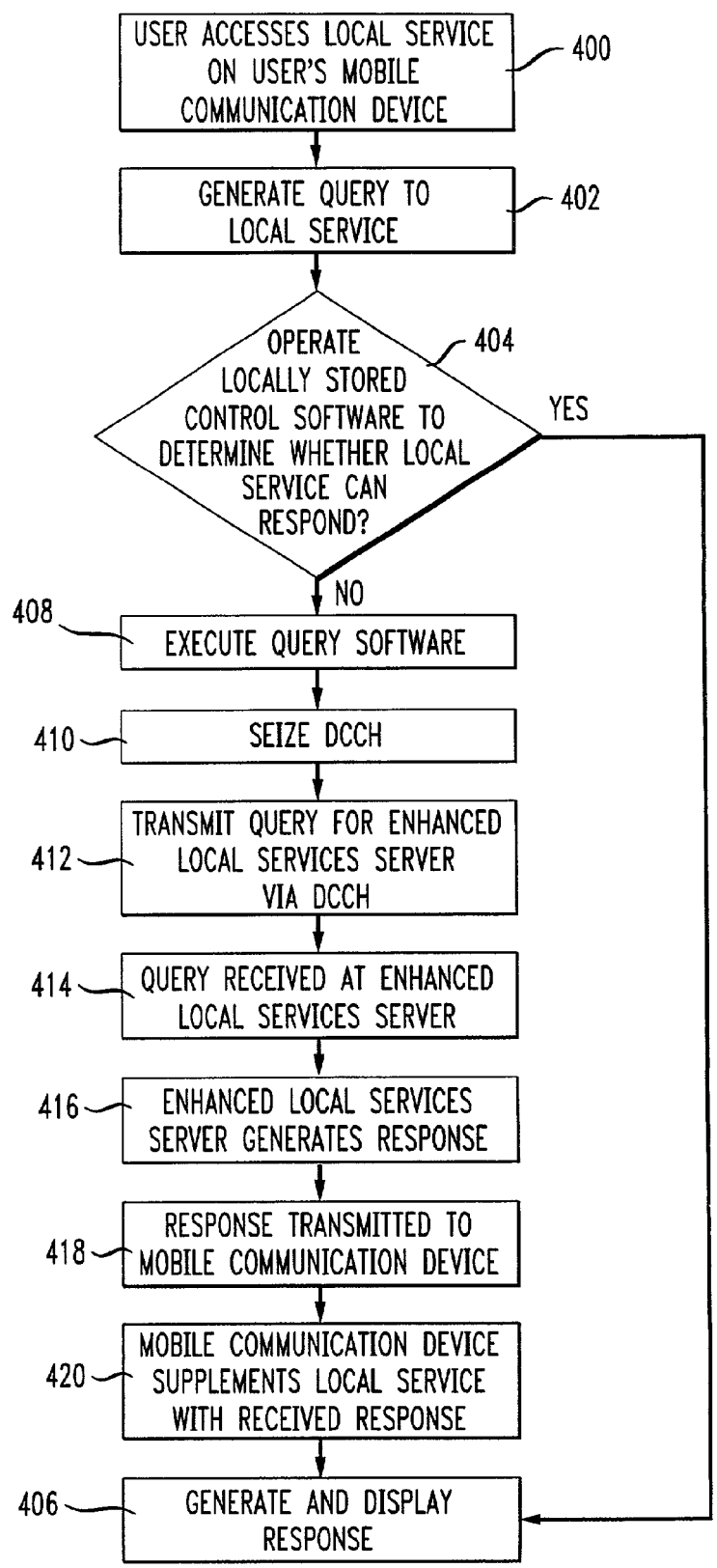
FIG. 4 is a block diagram illustrating components of a mobile communication device usable in connection with an embodiment of the present invention.

FIG. 4 provides a flow diagram of a process in accordance with an embodiment of the present invention and which may be used with the system illustrated in FIG. 2. In this process, at step 400 a user can access a local service, such as Local Service X 314 (FIG. 4) on the user's mobile communication device 300 (FIG. 3). The user can then generate a query to the local service, step 402. The query can be simply a request to see information, such as calendar entries for a given date, or access to a particular field associated with a given entry, such as a telephone number for a given party. The mobile communication device 300, 200, 201 then executes locally stored control software 320 (FIG. 3) to determine whether the local service can respond to the query itself, step 404. The locally stored control software 320 may make its determination based on, for example, data kept in a locally stored index, or through a query to the local service itself (e.g., Local Service X 314). Alternatively, when the user generates a query to the local service, the mobile communication device 300, 200, 201 can direct the query directly to the local service and avoid using any locally stored control software 320 as just described. Using either alternative, if the local service can respond to the query it does so and generates and displays a response, step 406. If, however, the control software 320, or in the alternate embodiment the local service software itself, results in finding that the local service cannot respond to the query, then the local service executes query software associated with the local service to generate a query to be transmitted to an enhanced local service server, step 408. This query may include an application identifier or application ID that is uniquely associated with the enhanced local application API. The application ID can also be used to indicate specific application API types. This allows device vendors to associate the API with the existing end device application, such as web searches for address book applications. The query should also contain a uniform resource locator (URL). The URL contains the location of the API to be executed when access to the enhanced local services server is required. This access can be via a data communication network such as the Internet. Thus, the enhanced local services server need not be co-located with any MSC with which it is associated. For example, in FIG. 2, the mobile communication device 200, which is associated with the wireless communication network of the first service provider 230, may send a query to enhanced local services server C 222, which is depicted as existing outside of the first service provider's 230 wireless communication network. Of course however, it is clear that enhanced local services server C 222 is coupled to the mobile switching center A 206 and thus in potential contact with mobile communication device 200. While FIG. 2 depicts the coupling as being via the Internet 118, such coupling could be made via any communication network, such as, for example, the PSTN 114.

The URL may take the form of a standard URL as defined in the WAP 1.0 specification. The URL may be used to request specific functions to be executed by a web-based application. For example, the URL may relate to address book extensions focusing on the various parameters associated with the address book including searching address book cards, getting address book cards, querying information into such cards, etc. Similarly, in the calendar example, the URL provides for calendar extensions involving searching the calendar, getting information from the calendar or putting information in the calendar. Furthermore, the calendars can be synchronized by the exchange of data as well.

Once the query has been generated, step 408, it must be transmitted into the wireless services network so as to be transported to its intended recipient, that is, the enhanced local services server responsible for the service in question. One technique for initiating this transfer is to seize a digital control channel (DCCH), step 410. This is a common operation for both initiating a wireless communication event for voice or data transfers over a digital traffic channel (DTC). Furthermore, the DCCH is now used for messaging such as R-Data messages that can be transferred between a mobile communication device and the network without need for opening a separate traffic channel. These data transfers take advantage of open time on the DCCH to transmit short messages or short data transactions thereby providing more optimal use of the allocable bandwidth for wireless communications. After the DCCH has been seized, step 410, the mobile communication device transmits the query to the enhanced local service server via the DCCH, step 412. The query is received at the enhanced local services server based on the URL that is part of the query, step 414. The enhanced local services server then generates a response to the query, step 416. At step 418, the response can be transmitted to the mobile station via either the DCCH, or alternatively, it can be transmitted over a DTC if the amount of data to be transmitted is significant. Once the mobile communication device receives the response, it supplements the local service with the received response, step 420. The mobile communication device may then generate and display the response, step 406.

Thus, in connection with the local service address book example described above, should a user decide to access information that is not available on the mobile communication device 300, 200, 201, that device can generate a query to an enhanced local services server 220, 221, 222 that is associated with the address book application. The local service application 314, 316 generates a query that requests the information sought from the server which enhances the local service. For example, the query could include information requesting that the enhanced local services server provide telephone data with regard to an individual or individuals not residing in the local service address book. The enhanced local services server 220, 221, 222, using its processing capabilities as well as programs for maintaining and manipulating data in a database, can generate a response to the query by searching for and subsequently transmitting the identified information via an over-the-air channel to the requesting mobile communication device 300, 200, 201.

Thus, the method and apparatus of the present invention provides the capability of allocating resources beyond those available within the local service of the mobile communication device itself. These allocated resources can be shared as they are placed in a network so as to supplement any local services available in a mobile communication device, be it a wireless telephone such as a digital PocketNet® phone available from AT&T Wireless, or other wireless communication/data processing devices.

In regard to the two specific examples of local services, the local address book can contain certain features which make the address book more usable by the user of the mobile communication device. In particular, the local address book application could provide a vCard 2.1 compliant reader and writer function. Furthermore, as referred to above, the address book could store, for example, approximately 200 entries. Each entry may consist of the following fields as defined in the vCard specification: first name; last name; street address; city; state; zip code; work phone; home phone; fax; mobile phone; e-mail address; and page number. It is estimated that each complete entry could average 100 characters or approximately 40 k of local memory. Local contacts could be stored alphabetically in a contact list, and could be accessible via a browser menu structure. Each contact entry, into either a phone or into a computer, could result in a synchronization process. Furthermore, the contact list may be integrated with an e-mail and an appointment function. The address book entries could reside in persistent storage, such as nonvolatile memory 312 (FIG. 3).

As for the local calendar service, it could include the features provided with a vCalendar 1.0 compliant reader and writer function. Furthermore, the local calendar may include a synchronization function, which accepts as input asynchronously pushed vCalendar objects and writes them to local storage. Furthermore, the local calendar may provide a function that can generate vCalendar objects to be used for synchronization with calendar applications that can be located on external servers. The local calendar can be capable of alerting a user by both an audible and visual means of upcoming appointments or events. This notification alert could be generated no less than five minutes prior to the event; other notification alert times are, of course, available. The mobile communication device could be able to store, for example, three months worth of appointments. Estimating 50 characters per appointment, eight appointments per day and five days per week, it would require approximately 48 k octets of local memory. The user may be able to select which three months of data are being locally stored and viewed, such as, for example, the current month, the past month and next month, or the current month, the next month and the subsequent month, or any other three month combination. The user could also be able to enter data for any day over a given period, such as, for example, the next twelve months, whereby such information, if it is not to be stored locally, will be stored in an enhanced local services server. For example, a user may enter dates for a summer vacation even though the months of June, July, and August are not part of the three month local calendar window. Additionally, it would be beneficial if the user could view the previous and/or succeeding next twelve months on a month-by-month basis for purposes of understanding the days of the week. For example, by viewing a single month presented on the device screen, a user would know the day associated with January 1. It would not be necessary for appointments to be able to be input from these month view screens. They could be provided simply as bit map screens for viewing only.

It should be recognized that the enhanced local services servers 220, 221, 222 themselves can be constituted by standard web-site serving server equipment. A difference may be in the control software running on the server that supports the activity of enhancing a local service. The specifics of that control software will vary based on the type of service in question. The software may provide for a query/response protocol, which will enable the mobile communication devices 300, 200, 201 to retrieve data that will enhance the particular local service.

It should also be recognized that over-the-air activation services can be utilized for programming local services into the mobile communication device. In those circumstances, rather than loading the local service software on the device, either at the point of purchase or by connection to a computer, the device can receive over-the-air transmissions which include data messages incorporating the software appropriate for executing a given local service. This provides the system with additional flexibility in terms of the services available locally at the mobile communication device.

Thus, the present invention provides for extendable services to be accessible via a mobile communication device thereby providing enhanced local services.

The disclosed embodiments are illustrative of the various ways in which the present invention may be practiced. Other embodiments can be implemented by those skilled in the art without departing from the spirit and scope of the present invention.

What is claimed is:

1. A method for providing enhanced features at a mobile communication device, the device including a first feature having a first set of sub-features, comprising:
   receiving, from a user, at the mobile communication device, a request for one of the sub-features;
   searching the mobile communication device for the requested sub-feature;
   searching one of an enhanced local services server and a private web site for the requested sub-feature, if the requested sub-feature is not resident on the mobile communication device;
   accessing, via a wireless digital control channel, the requested sub-feature from the one of the enhanced local services server and the private web site; and
   receiving the requested sub-feature at the mobile communication device, wherein said first feature defines a calendar service and wherein said first set of sub-features defines a portion of a user defined calendar to be stored at the mobile communication device.

2. The method of claim 1, wherein the requested sub-feature is received via the wireless digital control channel.

3. The method of claim 1, wherein the device further includes a second feature with a second set of sub-features the second feature defining an address book service and wherein the second set of sub-features defines a portion of a user-defined address book to be stored at the mobile communication device.

4. The method of claim 3, wherein a second received request comprises a request for access to a portion of said user defined address book which is stored in the wireless network.

5. The method of claim 4, wherein the requested portion of the user defined address book stored in the wireless network is received via the wireless digital control channel.

6. The method of claim 4, further comprising:
   receiving an update transmission from said mobile communication device to effect a modification of said user defined address book stored in the wireless network.

7. The method of claim 6, wherein the update transmission is received via the wireless digital control channel.

8. The method of claim 1, wherein said received request comprises a request for access to a portion of said user defined calendar which is stored in the wireless network.

9. The method of claim 8, wherein the requested sub-feature is received via the wireless digital control channel.

10. The method of claim 8, further comprising receiving an update transmission from said mobile communication device to effect a modification of said user defined calendar stored in the wireless network.

11. A method for provisioning services to a mobile communication device, comprising:
    programming the mobile communication device to provide a first set of features defining an aspect of a first service;
    programming a wireless network server to provide a second set of features, supplementing said first set, to fully define said first service;
    receiving, at the mobile communication device, a command to access said first service;
    responsive to said command, determining whether said first set of features can satisfy said command; and
    if it is determined that said first set of features cannot satisfy said command then automatically transmitting a request to satisfy said command to said wireless network server, wherein the request to satisfy said command is transmitted via a wireless digital control channel, and wherein said first service comprises a calendar service having a plurality of scheduling options.

12. The method of claim 11, wherein said aspect of the first service comprises a monthly scheduler capable of handling a subset of the scheduling options in the calendar service.

13. The method of claim 12, wherein said command requests to schedule an event outside of the scheduling options available with said aspect of the first service.

14. The method of claim 13, wherein said mobile communication device queues said command and performs said step of transmitting when a communication path to said wireless network server becomes available.

15. The method of claim 11, further including:
    programming the module communication device to provide a third set of features defining an aspect of a second service;
    programming the wireless network server to provide a fourth set of features, supplementing the third set, to fully define the second service;
    receiving at the mobile communication device, a second command to access the second service;
    responsive to the second command determining whether the third set of features can satisfy the second command; and
    if it is determined that the third set of features cannot satisfy the second command then automatically transmitting a request to satisfy the second command to the wireless network server, wherein said second service comprises an address book.

16. The method of claim 15, wherein said aspect of the second service comprises access to a first portion of said address book.

17. The method of claim 16, wherein said second command requests access to another portion of said address book, different from said first portion.

18. The method of claim 17, wherein said mobile communication device queues said command and performs said step of transmitting when a communication path to said wireless network server becomes available.

19. A system for providing service features to a mobile communication subscriber, comprising:
    a mobile communication network;
    a mobile network services server coupled to said mobile communication network; and
    a mobile communication device coupled to said mobile communication network via an over-the-air transmission path, said mobile communication device including,
        a processor; and
        a memory coupled to said processor and storing therein a program to perform the operations of,
            generating a command for a first communication service based on a subscriber inputs;
            determining whether said first communication service can be satisfied by the mobile communication device as a stand alone device, and
            if it is determined that said mobile communication device cannot satisfy said first communication service, then automatically transmitting a service request to said mobile network services server via said over-the-air transmission path, wherein said over-the-air transmission path comprises a wireless digital control channel, and wherein said first communication service relates to a calendar service.

20. The system of claim 19, further including:
    generating a command for a second communication service based on subscriber input;
    determining whether the second communication service can be satisfied by the mobile communication device as a stand alone device; and
    if it is determined that the mobile communication device cannot satisfy the second communication service, then automatically transmitting a service request to the network service server via the over-the-air transmission path wherein said second communication service relates to a personal address book service.

21. The system of claim 19, wherein said communication service relates to a personal information management service.

* * * * *